Oct. 10, 1933.  E. P. GUNDRY  1,929,779
FENDER WELL TIRE CARRIER
Filed April 11, 1932

Inventor
Eldon P. Gundry
By Blackmore, Spencer & Fink
Attorneys

Patented Oct. 10, 1933

1,929,779

UNITED STATES PATENT OFFICE 1,929,779

FENDER WELL TIRE CARRIER

Eldon P. Gundry, Flint, Mich., assignor to General Motors Corporation, Detroit, Mich., a corporation of Delaware Application April 11, 1932. Serial No. 604,450

6 Claims. (Cl. 224—29)

This invention relates to motor vehicles and more particularly to an improvement in spare tire carriers.

It is an object of the invention to provide a mounting of the fender well type for the extra or spare tire assembly which forms part of the regular automobile equipment to enable quick and convenient replacement if one of the tires in use becomes deflated due to puncture or other reason.

More specifically, the invention aims to provide a sturdy carrier of neat appearance and one in which the tire is partly received within a pocket or well in the fender and is supported wholly and directly by the vehicle chassis or main frame, the support involving a hub fixedly positioned above the well with a series of radial spokes for engagement with the tire, one of the spokes being detachable to allow for the mounting or removal of a tire, and the fender well, while being relieved of tire weight serving in cooperation with the support to prevent theft and unauthorized removal of the tire and furthermore, conserving space and allowing the spare tire to be positioned at the side of the vehicle just forward of the door to the driver's seat and back of the front wheel.

Figure 1:
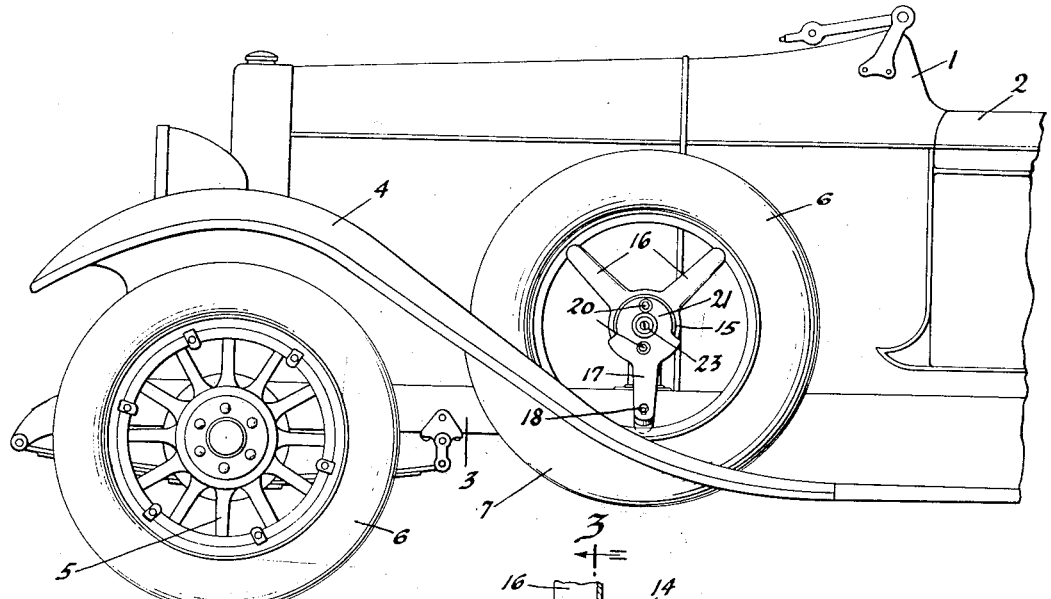
Figures 2, 3:
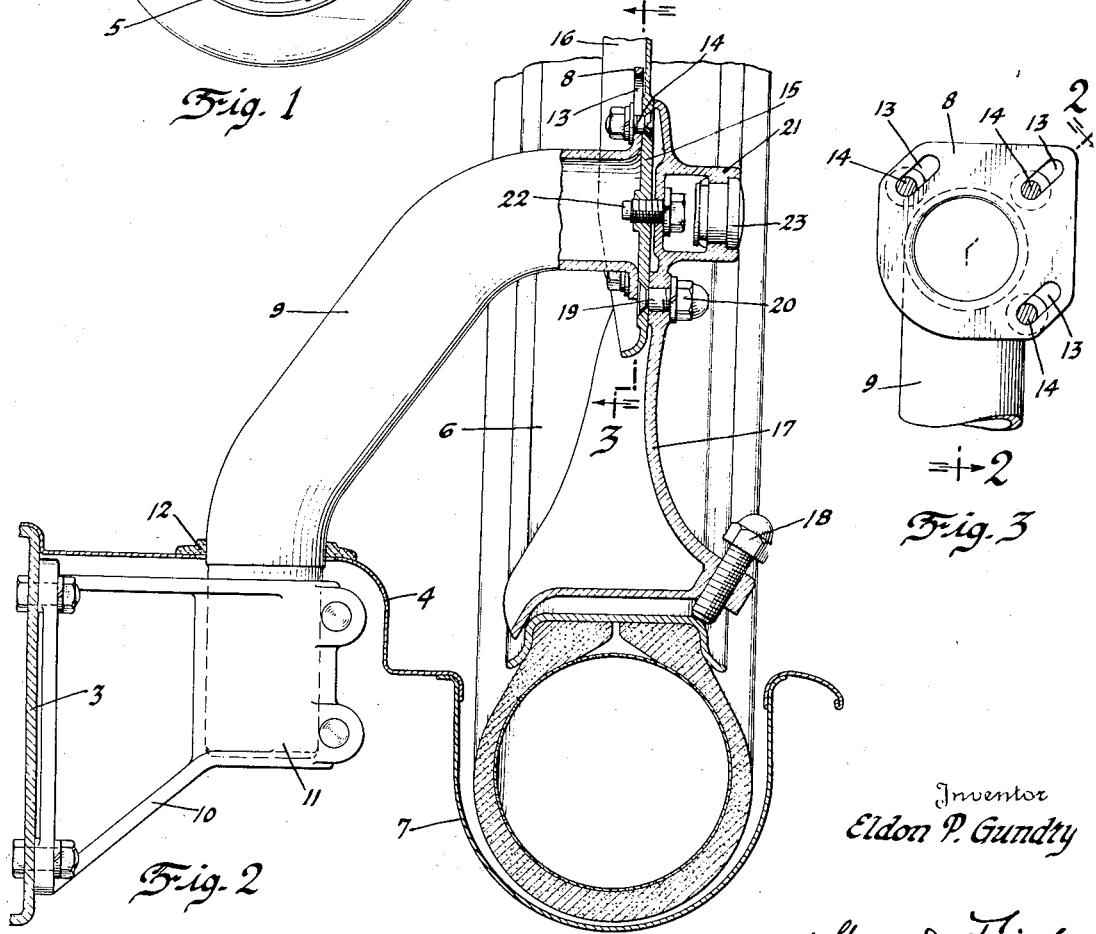

Additional objects and advantages will become apparent during the course of the following detailed specification having reference to the accompanying drawing, wherein Figure 1 is a side elevation of the front portion of an automobile; Figure 2 is a vertical sectional view of the tire carrier and is taken substantially on line 2—2 of Figure 3, and Figure 3 is a detail elevation looking in the direction of the arrows on line 3—3 of Figure 2.

Referring to the drawing, the reference character 1 indicates an automobile body having a front door 2 and being supported upon a chassis frame 3 which also serves as a mounting for the fender or mud guard 4 over the front wheel 5. According to conventional practice, the wheel 5 is shown with a demountable tire 6, including a tire casing and a mounting rim therefor. In the event of damage to the tire, it is the practice to remove the tire assembly from the wheel and replace it with a spare tire so that the repair may be taken care of later and at the convenience of the car owner.

As a convenient way of carrying the spare tire it is here proposed to mount the extra tire assembly at the side of the vehicle just above the fender 4 and between the front wheel 5 and car door 2. Partly with the idea of conserving space and to present a balanced appearance, the fender 4 is provided with a pocket or well 7, which receives and encloses the lowermost portion of the spare tire 6.

Directly above the well and in fixed spaced relation therewith is a hub like flat plate 8 located centrally of the opening provided by the annular tire and formed as an intergral part of an inwardly and downwardly extending tube or support 9, whose lower end is secured by means of a bracket 10 to the chassis frame member. This bracket 10 may consist of a casting having a lateral projection terminating with a split eye 11, which may be contracted about the lower portion of the tube 9. The tube 9 is thus rigidly anchored to the chassis frame, the split eye affording a certain amount of initial vertical adjustment. As shown in the drawing, the bracket is preferably located beneath the fender apron so as to be concealed from view. To further enhance the general appearance of the support, use may be made of the escutcheon or collar 12 surrounding the tube adjacent the opening in the apron through which the tube projects.

In the flat plate or vertical flange 8 at the outer end of the tube 9 is shown a series of three elongated slots 13 extending in a direction generally perpendicular or at substantially right angles to the pocket 7. Extending through these slots and adjustable back and forth therein, are a number of mounting studs 14, by which is adjustably secured to the plate 8, a supporting member 15 having a pair of radial spokes or forks 16 extending upwardly therefrom. The outer ends of the two forks may be formed of substantially channel shape to receive the inside of the tire at the upper portion thereof. By means of the pin and slot connection 13—14 the position of the supporting spokes 16 may be adjusted with reference to the tire receiving well 7 to accommodate tires of various sizes. The adjustment for a given size tire preferably is so made that the weight of the tire is taken entirely by the supporting arms with the tire out of contact with the well. This arrangement not only relieves the fender from strain, but also precludes chafing and wear of the tire tread.

To removably secure the tire in place, use may be made of the downwardly extending retainer or spoke 17 detachably connected at the hub portion of the support and engaging the tire, at or adjacent that portion located within the well. The tire seat at the outer end of the spoke 17 is preferably of channel shape in cross section to receive the rim and if desired, the channel formation may be afforded in the manner shown in the drawing where the spoke has an outwardly extending lug on one side and an adjustable stud 18 at its opposite side. In addition to the fact that the adjustable stud 18 takes care of variation in rim sizes, it is useful for insuring a firm mounting of the tire, inasmuch as the stud may be threaded in to push the tire down into tight seating engagement with each of the series of spokes. The attachment connections at the hub for the removable spoke 17 may include a pair of studs 19 riveted or otherwise secured to the plate 15 for projection through alined openings in the enlarged inner end of the removable spoke with the fastening nuts 20 removably threaded on their outer ends.

As a precaution against theft, the removable spoke 17 may be provided at the hub with a hollow boss 21 which encloses the head of a stud 22 threadedly received within an opening in the plate member 15. This hollow boss is closed by a plug 23 enclosing suitable mechanism for locking it in place against unauthorized removal. With the lock housing 23 in place, access cannot be had to the fastening stud 22 and therefore the spoke 17 cannot be taken off the hub, even though the nuts 20 are removed. Neither can the spoke be swung about the axis of the stud 22, inasmuch as the locking stud firmly clamps the parts 15 and 17 together with the studs 19 projecting through the openings in the retainer spoke. As it can best be seen in Figure 1, the top of the well projects beyond the inside of the tire assembly and cooperates with the support in preventing surreptitious removal of the tire even though the stud 18 is removed and the tire casing deflated.

I claim:

1. In a motor vehicle, a spare tire carrier, including a fender well to receive a tire, a hub above the well in fixed relation thereto, a pair of upwardly extending supports carried by the hub for engagement with the upper portion of the tire, an arm extending downwardly from the hub into engagement adjacent the well with the lower portion of the tire, and means at the hub to detachably mount the arm.

2. In a motor vehicle, a spare tire carrier, including a fender well to receive a tire, a hub above the well in fixed relation thereto, a pair of upwardly extending supports carried by the hub for engagement with the upper portion of the tire, a detachable retainer arm projecting downwardly from the hub and engageable adjacent the well with the lower portion of the tire for cooperating with the well to hold the tire in place, means for removably mounting the retainer arm on the hub and a lock associated with said attachment means to prevent unauthorized manipulation thereof.

3. In a motor vehicle, a spare tire carrier including a hub, an outwardly extending spoke fixedly carried by the hub and adapted to engage and support at its outer end the rim of a spare tire, another outwardly extending spoke detachably mounted on the hub and adapted to engage at its outer end the spare tire rim in circumferentially spaced relation to the first mentioned spoke to removably secure the rim, and a pocket fixed relative to said hub and adapted to receive a portion of the tire adjacent the detachably mounted spoke for cooperation therewith in retaining the tire in place.

4. Means to carry a spare tire, including a fender well to receive the tire, a supporting hub positioned above the well and within the tire, a series of outwardly extending spokes carried by the hub for engagement with the inner periphery of the tire at circumferentially spaced points, and means detachably mounting one of said spokes on the hub.

5. In a motor vehicle, a spare tire carrier including a fender well to receive the tire, a hub spaced above the well and provided with a series of radiating arms for engagement at their outer ends with the tire, lock controlled means on said hub for detachably mounting one of said arms in a position in which it projects downwardly toward the well for cooperation therewith in retaining the tire in the well.

6. In a motor vehicle, a spare tire carrier including a fender having a well to receive a portion of the tire, a supporting hub spaced from the fender a sufficient distance to allow the passage of the portion of the tire received in the well and provided with outwardly extending means to engage and support the tire independently of the well, and lock controlled means detachably mounted on the hub and projected into the space between the hub and fender to restrict the size thereof and cooperate with the fender in precluding removal of the tire.

ELDON P. GUNDRY.